United States Patent [19]
Houlihan et al.

[11] 3,761,526
[45] Sept. 25, 1973

[54] ARYL AND CYCLOALKYL SUBSTITUTED NAPHTHOLS

[75] Inventors: William J. Houlihan, Mountain Lakes; Jeffrey Nadelson, Parsippany, both of N.J.

[73] Assignee: Sandoz-Wander Inc., Hanover, N.J.

[22] Filed: Apr. 14, 1971

[21] Appl. No.: 134,040

[52] U.S. Cl. ...... 260/619 F, 260/613 R, 260/343.2, 260/559 R, 424/346
[51] Int. Cl. ............................................ C07c 39/14
[58] Field of Search ............. 424/347; 260/620, 260/619 F, 619 D, 613 R

[56] References Cited
OTHER PUBLICATIONS

Elsevier's Encyclopedia of Organic Chemistry, Series III, Vol. 12B, (1950), pages 1444, 1456, 1457.

Elsevier's Encyclopedia of Organic Chemistry, Series III, Vol. 13, (1946), pages 279–281.

*Primary Examiner*—Bernard Helfin
*Attorney*—Gerald D. Sharkin, Thomas C. Doyle, Robert S. Honor, Walter F. Jewell, Thomas O. McGovern, Richard E. Vila and Frederick H. Weinfeldt

[57] ABSTRACT

Aryl and cycloalky substituted naphthols, e.g., 3-p-chlorophenyl-1-naphthol or 1,2,3,4-tetrahydroanthracen-9-ol are prepared by the acid rearrangement of benzoic acid lactones and are useful as antimicrobial agents.

5 Claims, No Drawings

ARYL AND CYCLOALKYL SUBSTITUTED NAPHTHOLS

The invention relates to 1-naphthol derivatives. In particular this invention concerns 3-aryl substituted and 2,3-cycloalkyl substituted naphthols, intermediates and processes used in their preparation and their use as antimicrobials.

The compounds of this invention may be represented by the following structural formula:

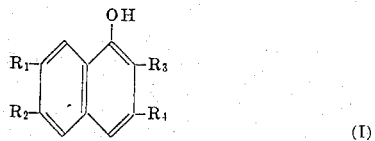

(I)

where $R_1$ and $R_2$ each independently represent hydrogen or halo having an having an atomic weight of about 19 to 36;

$R_3$ represents hydrogen, lower alkyl, i.e., alkyl having 1 to 4 carbon atoms, e.g. methyl, ethyl, isopropyl and the like or $R_4$ represents

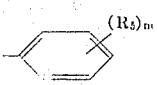

and

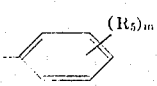

where m is 1 or 2;

$R_5$ represents hydrogen, halo having an atomic weight of about 19 to 36, trifluoromethyl, lower alkyl as defined above or lower alkoxy, i.e. alkoxy having 1 to 4 carbon atoms, e.g., methoxy, ethoxy, isopropoxy and the like or $R_3$ and $R_4$ together represent

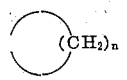

where n is an integer of from 4 to 10 provided trifluoromethyl groups are not bonded to adjacent carbon atoms.

The compounds of the formula

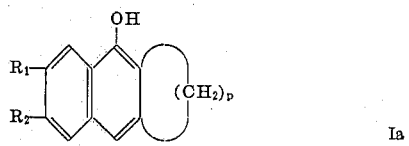

Ia where p is 5 to 10 and $R_1$ and $R_2$ are as defined above are especially preferred.

The compounds of formula (I) may be prepared in accordance with the following reaction scheme

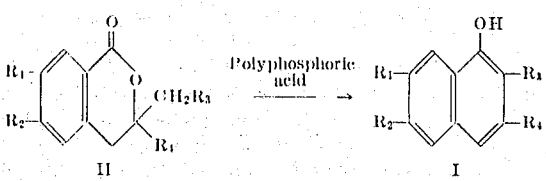

where $R_1$, $R_2$, $R_3$, $R_4$ and the proviso are set out above.

The compounds of formula I are prepared by treating a compound of formula II with polyphosphoric acid. The polyphosphoric acid can be any of the known polyphosphoric acids or modified polyphosphoric acids. Although a solvent is not essential, it is preferred that the reaction be run in excess polyphosphoric acid. If desired, a holongenated aliphatic hydrocarbon such as methylene dichloride can be used as the solvent or as a cosolvent. The temperature at which the reaction is run is not critical, but it is preferred that the reaction be carried out between 80° and 120°C, especially between 100° to 110°C. For optimum results, the reaction should be run for 10 minutes to 1 hour, The product (I) is recovered by convention techniques, e.g., extraction and evaporation.

The compounds of formula II are novel and may be prepared according to the following process

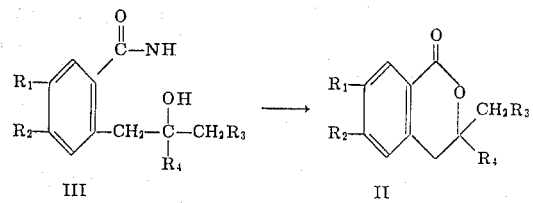

where $R_1$, $R_2$, $R_3$, $R_4$ and the proviso are as set out previously.

The compounds of formula II are prepared by heating a compound of formula III. Although a solvent is not essential, it is preferred that the reaction be run in an inert solvent, e.g. benzene, toluene, xylene, and hologenated hydrocarbon such as chlorobenzene and dichlorobenzene. The temperature at which the reaction is run is not critical, but it is preferred that the reaction be carried out between about 70° and 200°C, expecially at the reflux temperature of the medium. For optimum results, the reaction should be run for 12 hours to 48 hours, preferably 18 to 24 hours, although the time is not critical. The product (I) is recovered by convention techniques, e.g., evaporation.

The compounds of formula III except those in which $R_3$ and $R_4$ is

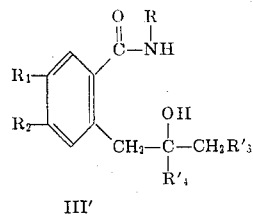

are novel and may be prepared according to the following reaction scheme

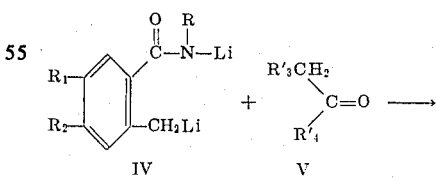

where
- $R_1$ and $R_2$ are as defined above;
- R represents a straight chained lower alkyl having 1 to 4 carbon atoms, e.g., methyl ethyl, n-propyl and the like;
- $R'_3$ represents hydrogen, lower alkyl as defined above or

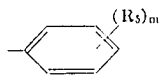

and $R'_4$ represents

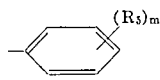

where
- $m$, $R_5$ and the proviso are as set out above or $R'_3$ and $R'_4$ together represent

where
- $p$ is an integer between 5 to 10.

The compounds of formula III' are prepared by treating a compound of formula IV with a carbonyl compound of formula V. Although a solvent is not essential, it is preferred that the reaction be run in excess carbonyl of formula V or in ethers such as diethyl ether or tetrahydrofuran or in hydrocarbons such as hexane, benzene, toluene and the like. Ether and tetrahydrofuran are especially preferred. The temperature at which the reaction is run is not critical, but it is preferred that the reaction be carried out between −40°C and 35°C, especially between −30° and 0°C. For optimum results, the reaction should be run for 4 to 16 hours, preferably 8 to 10 hrs. although the time is not critical. The product (I) is recovered by convention techniques, e.g., evaporation.

The compound of formula III which is α-(1-hydroxycyclohexyl)-N-methyl-α-toluamide and many of the compounds of formula IV and V are known and may be prepared by methods disclosed in the literature, e.g., the compounds of formula IV can be prepared by treating the corresponding toluamide with an alkyl lithium such as n-butyl lithium using standard techniques. The compound of formula IV and V not specifically disclosed in the literature may be prepared by analogous techniques using known starting materials.

The compounds represented by formula (I) above are useful as antimicrobial agents as indicated by their activity at concentrations of 1 to 100 micrograms/ml in vitro against organisms such as staphylococcus aureus, streptococcus faecalis, bacillus subtilis, escherichia coli, proteus vulgaris, histoplasma capsulatum, candida albicans, aspergillus niger, and the like. This is indicated by their activity when tested using a conventional serial dilution test.

For such usages, compounds (I) may be administered orally, parenterally or topically as such or admixed with conventional pharmaceutical carriers. They can be administered orally in such forms as tablets, dispersible powders, granules, capsules, syrups, and elixirs; parenterally as solutions, suspensions, dispersions, emulsions, and the like, e.g., a sterile injectable aqueous suspension and topically as solutions, salves and the like. These pharmaceutical preparations may contain up to about 90 percent of the active ingredient in combination with the carrier or adjuvant.

Although the antimicrobial effective dosage utilized will vary depending upon the compound employed and the mode of administration, in general, satisfactory results are obtained when these compounds are orally administered for systemic use at a daily dosage of about 3 mg. to about 100 mg. per kilogram of animal body weight. This daily dosage is preferably administered 2 to 4 times a day, or in sustained release form. For most large mammals in need of said treatment the total daily dosage is from about 100 mg. to about 4 gm. Dosage forms suitable for internal use comprise about 25 mg. to about 2.0 g. of active compound in intimate admixture with a solid or liquid pharmaceutically acceptable carrier or diluent.

The preferred pharmaceutical compositions from the standpoint of preparation and ease of administration are solid compositions, particularly hard-filled capsules and tablets containing about 100 to 500 milligrams of active ingredient.

Tablets and capsules containing the ingredients indicated below may be prepared by conventional techniques and are useful as antimicrobial agents at a dose of one tablet or capsule 2 to 4 times a day.

| Ingredients | Weight (mg.) tablet | capsule |
|---|---|---|
| 1,2,3,4-tetrahydro-anthracen-9-ol | 250 | 250 |
| Tragacanth | 10 | |
| Lactose | 197.5 | 250 |
| Corn starch | 25 | |
| Talcum | 15 | |
| Magnesium stearate | 2.5 | |

The following pharmaceutical compositions are formulated with the indicated amount of active agent using conventional techniques. The injectable suspension and the oral liquid suspension represent formulations useful as unit doses and may be administered as antimicrobial agents. The injectable suspension is suitable for administration once a day whereas the oral liquid suspension is suitably admininstered 2 to 4 times per day for this purpose.

| Ingredients | Weight (mg) sterile injectable suspension | oral liquid suspension |
|---|---|---|
| 3-p-chlorophenyl-1-naphthol | 50 | 50 |
| sodium carboxy methyl cellulose U.S.P. | 1.25 | 12.5 |
| methyl cellulose | 0.4 | |
| polyvinylpyrrolidone | 5 | |
| lecithin | 3 | |
| benzyl alcohol | 0.01 | |
| magnesium aluminum silicate | | 47.5 |
| flavor | | q.s. |
| color | | q.s. |
| methyl paraben, U.S.P. | | 4.5 |
| propyl paraben, U.S.P. | | 1.0 |
| polysorbate 80 (e.g. Tween 80), U.S.P. | | 5 |
| sorbitol solution, 70%, U.S.P. | | 2,500 |
| buffer agent to adjust pH for | | |

| desired stability | q.s. | q.s. |
| water | for injection, | |
| | q.s. to 1 ml. | q.s. to 5 ml. |

EXAMPLE 1 o-(2-hydroxy-2-p-chlorophenylpropyl)-N-methyl benzamide

Into a flask equipped with a stirrer, dropping funnel, gas inlet tube and thermometer is charged 53 g (0.35)mole of N-methyl-o-toluamide and 400 ml of dry tetrahydrofuran. The mixture is blanketed with nitrogen and cooled to an internal temperature of about 0°C. To this mixture is added dropwise, with stirring over a period of 0.5 hr, 450 ml. of 15% n-butyl lithium-hexane solution (0.72 mole n-Buli). The reaction is stirred an additional 1.5 hr. at room temperature and then cooled to −30°C ± 10°. A solution of 58.5 g(0.38 mole) of p-chloroacetophenone in 150 ml dry tetrahydrofuran is added dropwise. The temperature is allowed to rise to room temperature and is maintained there for about 8 hrs after which 50 ml of saturated ammonium chloride is added dropwise. The resultant solids are filtered and the filtrate is concentrated in Vacuo to yield o-(2-hydroxy-2-p-chlorophenylpropyl)-N-methyl benzamide m.p.(160° − 161.5°; benzene).

Following the above procedure but using an equivalent amount of propiophenone, 3,4-dichloroacetophenone, cyclohexanone, cyclooctanone, or cyclododecanone, in place of the p-chloroacetophenone above there is obtained o-(2-hydroxy-2-phenylbutyl)-N-methylbenzamide (m.p. 123°–125°;C$_6$H$_6$) o-(2-hydroxy-2-[3,4-dichlorophenyl]propyl)-N-methylbenzamide (m.p. 74°–75°;i-C$_3$H$_7$OH); α-(1-hydroxycyclohexyl)-N-methyl-o-toluamide(m.p.167°–169°C; C$_6$H$_6$); α-(1-hydroxycyclooctyl)-N-methyl-o-toluamide (m.p. 159°–160°, THF) or 2-(α-1-hydroxycyclododecyl)-N-methyl-o-toluamide, (m.p. 199°–205°; CH$_3$Cl/CH$_3$OH).

When the above reaction is carried out using N-methyl-6-chloro-o-toluamide in place of the N-methyl -o-toluamide or 4',4''-dichloro-2-phenylacetophenone, p-trifluoromethylacetophenone, p-methylacetophenone or p-methoxyacetophenone is used in place of the p-chloroacetophenone there is obtained o-(2-hydroxy-2-p-chlorophenylpropyl)-N-methyl-p-chloroben-zamide, o-(2-hydroxy-2,3-di-[p-chlorophenyl]propyl)-N-methyl-benzamide, o-(2-hydroxy-2-p-tolylpropyl)-N-methyl-benzamide or o-(2-hydroxy-2-p-methoxyphenylpropyl)-N-methyl-benzamide respectively.

EXAMPLE 2 o-(2-hydroxy-2-p-chlorophenylpropyl)-benzoic acid lactone

Into a flask equipped with a stirrer, condenser and heating mantle is charged 60 g. of o-(2-hydroxy-2-p-chlorophenylpropyl)-N-methyl benzamide and 750 ml. of xylene. The mixture is stirred and refluxed for 26 hours after which the solvent is removed in vacuo to yield o-(2-hydroxy-2-p-chlorophenyl propyl)-benzoic acid lactone; m.p. 120°–121°C (C$_6$H$_6$-hexane).

Following the above procedure but using an equivalent amount of o-(2-hydroxy-2-phenylbutyl)-N-methylbenzamide, α-(1-hydroxycyclohexyl) -N-methyl-o- toluamide, α-(1-hydroxycyclododecyl)-N-methyl-o-toluamide, α-(1-hydroxycyclooctyl)-N-methyl-o-toluamide, or o -(2-hydroxy-2-[3,4-dichlorophenyl]propyl)-N-methylbenzamide in place of the o-(2-hydroxy-2-p-chlorophenylpropyl)-N-methylbenzamide, there is obtained o-(2-hydroxy-2-phenylbutyl)-benzoic acid lactone, (m.p. 91.5°–93°; Et$_2$O); o-(α-1-hydroxycyclohexylmethyl) benzoic acid lactone (b.p. 146°–150°; 1 mm.); o-(α-1-hydroxycyclododecylmethyl)benzoic acid lactone (m.p. 134-135°; Et$_2$O/i-PrOH); o-(α-1-hydroxycyclooctylmethyl) benzoic acid lactone (m.p. 81.5°–82°; i-ProH/H$_2$O) or o-(2-hydroxy-2-[3,4-dichlorophenyl]-propyl)benzoic acid lactone (m.p. 114°–115°; Et$_2$O/pentane)respectively.

When o-(2-hydroxy-2-p-chlorophenylpropyl)-N-methyl-p-chlorobenzamide, o-(2-hydroxy-2,3-di-[p-chlorophenyl]propyl)-N-methyl benzamide, o-(2-hydroxy-2-p-trifluoromethylphenylpropyl)-N-methyl-benzamide; o-(2-hydroxy-2-p-tolylpropyl)-N-methyl-benzamide; or o-(2-hydroxy-2-p-methoxyphenylpropyl)-N-methyl-benzamide is used in place of the o-(2-hydroxy-2-p-chlorophenylpropyl)-N-methyl-benzamide above, there is obtained o-(2-hydroxy-2-p-chlorophenylpropyl)-p-chlorobenzoic acid lactone, o-(2-hydroxy-2,3-di-[p-chlorophenyl]-propyl)benzoic acid lactone, o-(2-hydroxy -2-p-trifluoromethylphenylpropyl)benzoic acid lactone, o-(2-hydroxy-2-p-tolypropyl)benzoic acid lactone or o-(2-hydroxy-2-p-methoxyphenylpropyl) benzoic acid lactone respectively.

EXAMPLE 3

3-p-chlorophenyl-1-naphthol

Into a flask equipped with a stirrer and thermometer containing 315 g. of polyphosphoric acid heated to 110° C is added over a period of 20 minutes 20.0g (0.07 moles) of o-(2-hydroxy-2-p-chlorophenylpropyl)-benzoic acid lactone. After addition is complete the brown solution is poured onto 500 g of ice and extracted twice with 250 ml. of diethyl ether. The ether extracts are combined and dried with anhydrous magnesium sulfate. After filtration, the dried extract is concentrated to yeild 3-p-chlorophenyl-1-naphthol (m.p. 159°–150° C).

Following the above procedure but using an equivalent amount of o-(2-p-chlorophenyl-2-hydroxybutyl)-benzoic acid lactone, o-(α-1-hydroxycyclohexylmethyl) benzoic acid lactone, o-(α-1-hydroxycyclododecylmethyl)benzoic acid lactone, o-(α-1-hydroxycyclooctylmethyl) benzoic acid lactone or o-(2-hydroxy -2-[3,4-dichlorophenypropyl])benzoic acid lactone in place of the o-(2-hydroxy -2-p-chlorophenylpropyl)-benzoic acid lactone above there is obtained 3-p-chlorophenyl-2-methyl-1-naphthol, 1,2,3,4-tetrahydro anthrocen-9-ol(m.p. 102°–104°C); 2,3-decamethylene-1-naphthol (m.p. 124°–126°C); 2,3-hexamethylene -1-naphthol; or 3-(3,4-dichlorophenyl)-1-naphthol respectively.

When an equivalent amount of o-(2-hydroxy-2-p-chlorophenylpropyl) -p-chlorobenzoic acid lactone, o-(2-hydroxy-2,3-di-[p-chlorophenyl]propyl)-benzoic acid lactone, o-(2-hydroxy-2-p-trifluoromethylphenylpropyl)-benzoic acid lactone, o-(2-hydroxy-2-p-tolylpropyl)-benzoic acid lactone or o-(2-hydroxy-2-p-methoxy-phenylpropyl)-benzoic acid lactone is used in place of the o-(2-hydroxy-2-p-chlorophenylpropyl)-benzoic acid lactone above there is obtained 6-chloro-3-p-chlorophenyl-1-naphthol, 2,3-di[p-chlorophenyl]-1-naphthol, 3-p-trifluoromethylphenyl -1-naphthol, 3-p-tolyl-1-naphthol, or 3-p-methoxyphenyl-1-naphthol.

What is claimed is:

1. A compound selected from the group consisting of:
   a. 3-p-chlorophenyl-1-naphthol,
   b. 3-p-chlorophenyl-2-methyl-1-naphthol,
   c. 2,3-decamethylene-1-naphthol,
   d. 2,3-hexamethylene-1-naphthol,
   e. 3-(3,4-dichlorophenyl)-1-naphthol,
   f. 6-chloro-3-p-chlorophenyl-1-naphthol,
   g. 2,3-di-(p-chlorophenyl)-1-naphthol,
   h. 3-p-trifluoromethylphenyl-1-naphthol,
   i. 3-p-tolyl-1-naphthol and
   j. 3-p-methoxyphenyl-1-naphthol.

2. The compound of claim 1 which is 3-p-chlorophenyl-1-naphthol.

3. A compound having the formula

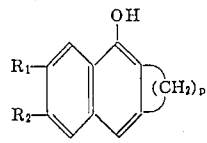

where
   $p$ is 5 to 10 and
   $R_1$ and $R_2$ are hydrogen.

4. The compound of claim 3 which is 2,3-decamethylene-1-naphthol.

5. A process for preparing a compound of the formula

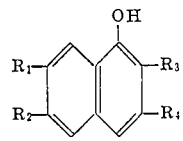

where
   $R^1$ and $R^2$ each independently represent hydrogen or halo having an atomic weight of about 19 to 36;
   $R_3$ represents hydrogen, lower alkyl or

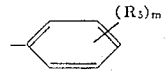

$R_4$ represents

where
   m is 1 or 2 and
   $R_5$ represents hydrogen, halo having an atomic weight of about 19 to 36, trifluoromethyl, lower alkyl or lower alkoxy or
   $R_3$ and $R_4$ together represent

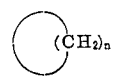

where
   n is an integer of from 4 to 10 provided trifluoromethyl groups are not bonded to adjacent carbon atoms which comprises rearranging a compound of the formula

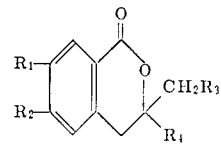

by treating it with polyphosphoric acid.

* * * * *